Patented Feb. 3, 1925.

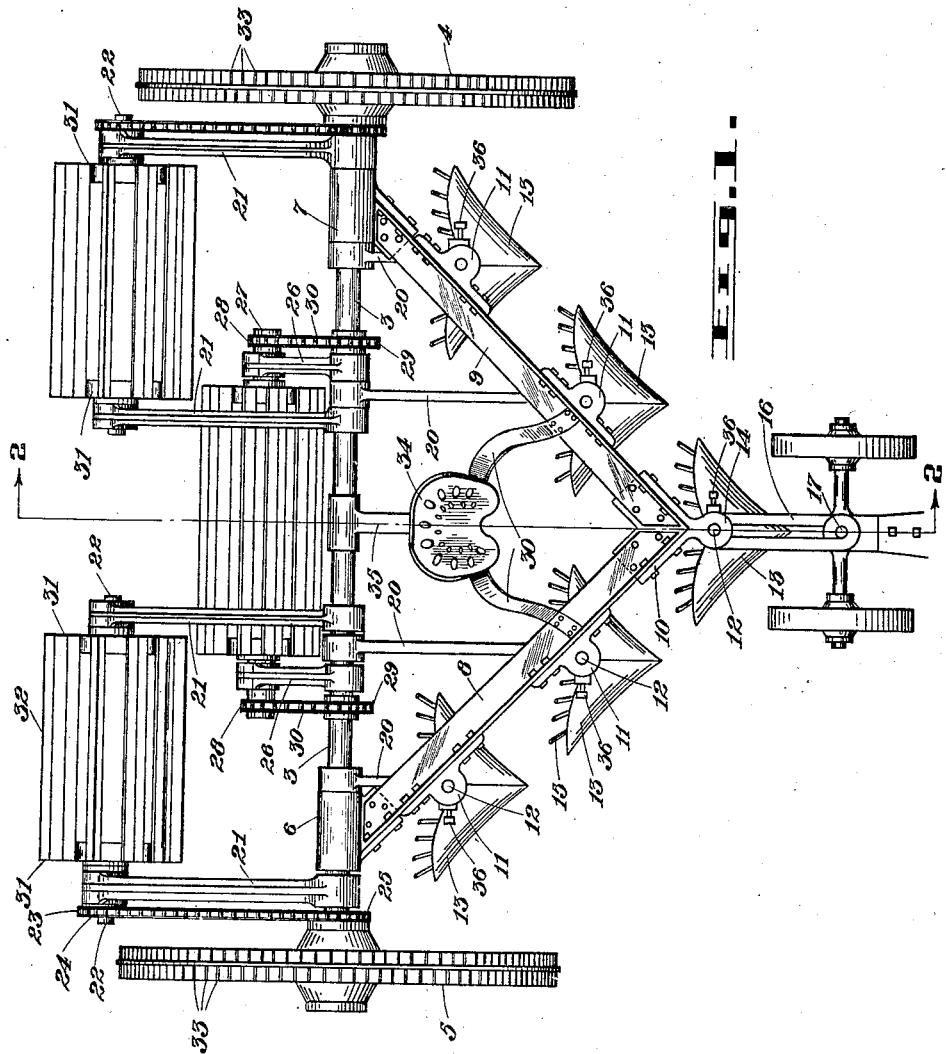

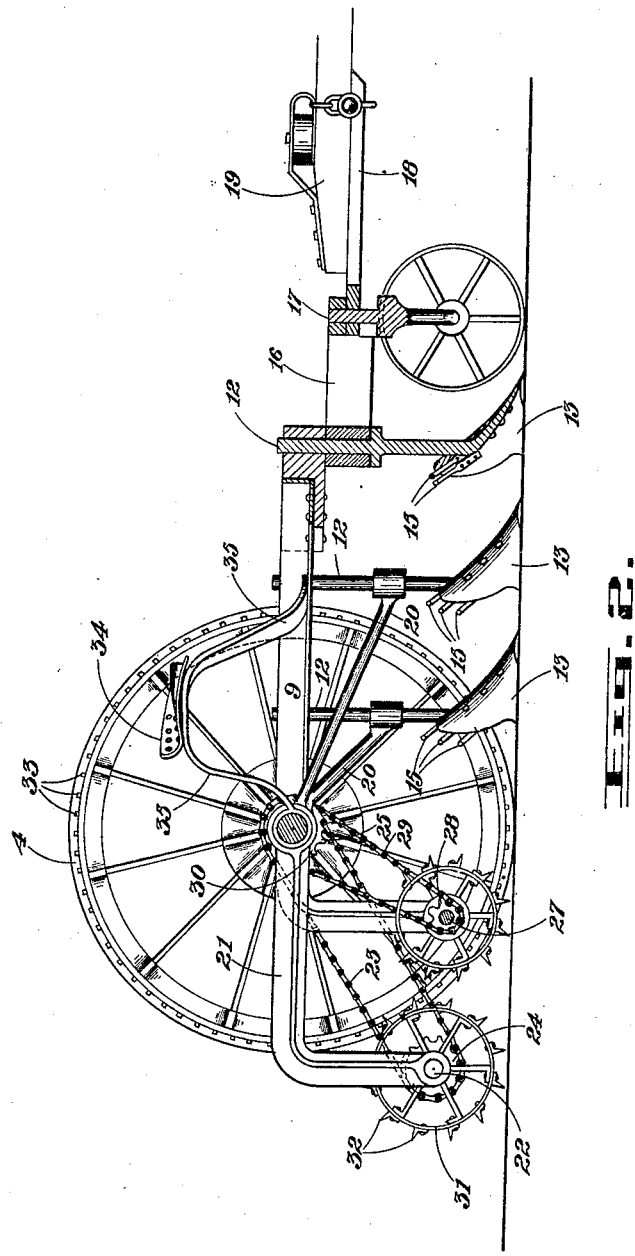

1,525,262

UNITED STATES PATENT OFFICE.

BURTON F. AUSTIN, OF CEREAL, ALBERTA, CANADA.

CULTIVATOR.

Application filed December 28, 1921. Serial No. 525,369.

*To all whom it may concern:*

Be it known that I, BURTON F. AUSTIN, a citizen of the Dominion of Canada, residing at Cereal, in the county of Medicine Hat and Province of Alberta, have invented certain new and useful Improvements in Cultivators, of which the following is a specification.

The present invention relates to farm implements and more particularly refers to cultivators adapted for use in the cultivation of soil for dry farming.

The principal object is to provide an implement of the character described which will plow the soil and cultivate the same simultaneously.

With this and other objects in view, the invention consists in the construction, combination and arrangement of parts as will be hereinafter fully described, illustrated in the accompanying drawings and pointed out in the claims hereunto appended.

Figure 1 is a top plan view illustrating my improved implement.

Figure 2 is a section on line 2—2 of Figure 1 in the direction of the indicating arrows.

Referring to the drawings, like numerals designate like parts in the various drawings.

The numeral 3 indicates the drive shaft of the implement which has wheels 4 and 5 mounted on its outer ends. Journal brackets 6 and 7 are positioned on the main drive shaft 3 and have angle arms 8 and 9 connected to them and to the bracket 10. Bearings 11 are mounted on the angle arms 8 and 9. Vertical standards 12 are positioned in these bearings and have plows 13 mounted on their lower ends.

A journal 14 is configurated on the bracket 10 for reception of the vertical standard 12. A plurality of knife bars 15 are positioned on the plows as indicated and are adapted to cut up the soil. The arm 16 extends from the bracket member 10 as illustrated more clearly in Figure 2.

Adjustable vertical standard 17 is positioned in the outer extremity of the arm 16, its lower end being connected to a truck which is adapted to support the forward part of the implement. Arm 18, through which the vertical standard 17 passes, has a draft rigging 19 mounted on the same. Brace arms 20 are loosely positioned on the transverse shaft 3 and are connected to the vertical standards 12 as indicated and are adapted to support the same. Bracket arms 21 are loosely positioned on the transverse shaft 3. Transverse shafts 22 extend through the bracket arms 21 and are driven by chains 23 trained over sprocket wheels 24 and 25. Bracket arms 26 are loosely positioned on the shaft and have a transverse shaft 27 journalled in bearings configurated on their lower ends. Sprocket wheels 28 mounted on the ends of the transverse shaft 27 are driven by chains 30 trained over sprocket wheels 29. The three rotary drums which are mounted on the transverse shafts 22 and the transverse shaft 27 are constructed of wheels 31 and have a plurality of knife bars 32 mounted on them.

The drive wheels 4 and 5 of the implement have projections 33 on their periphery.

In operation, the implement will be preferably drawn by draft animals or motive power which will be hitched to the rigging indicated by the numeral 19.

A seat indicated by the numeral 34 is positioned as indicated and is supported by the supporting arms 35.

The plows 13 are adapted to break up the soil and the rotary cultivators positioned at the rear of the machine are adapted to break up the lumps or furrows formed by the plows 13. Set screws 36 are positioned in each of the bearings on which the standards 12 are positioned and permit regulation of the plows 13.

While I have illustrated and described the preferred form of construction for carrying my invention into effect, this is capable of variation and modification without departing from the spirit of the invention. I, therefore, do not wish to be limited to the precise details of construction specified, but desire to avail myself of such variations and modifications as come within the scope of the appended claims.

From the foregoing, it is thought that the construction of my invention will be clearly understood, and therefore, a more extended explanation has been omitted.

What I claim as new is:

1. In a cultivator, a wheel-supported axle, angularly-disposed arms journaled on said axle, plows carried by said arms, a plow mounted at the apex of said arms, and a seat support mounted on said arms and on the drive shaft.

2. In a cultivator, a wheel-supported axle, angularly-disposed arms journaled on said axle, plows carried by said arms, a plow mounted at the apex of said arms, and brace arms loosely mounted on said axle and attached at their forward ends to the said angularly-disposed arms adjacent said apex.

In testimony whereof I affix my signature in the presence of two witnesses.

BURTON F. AUSTIN.

Witnesses:
 A. D. BUSSARD,
 J. C. COTTRELL.